Dec. 13, 1949  D. L. LAWRENCE  2,491,009
MOTOR VEHICLE ATTACHMENT
Filed June 13, 1947
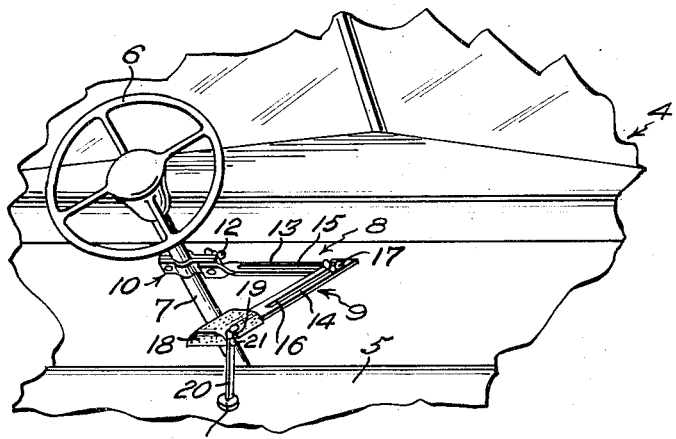
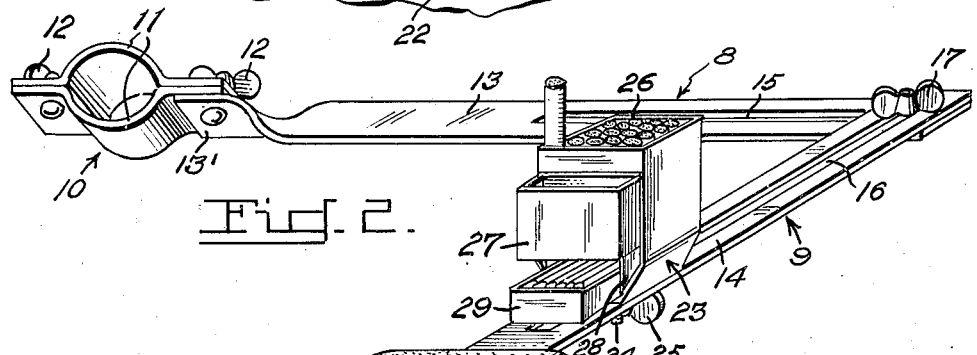
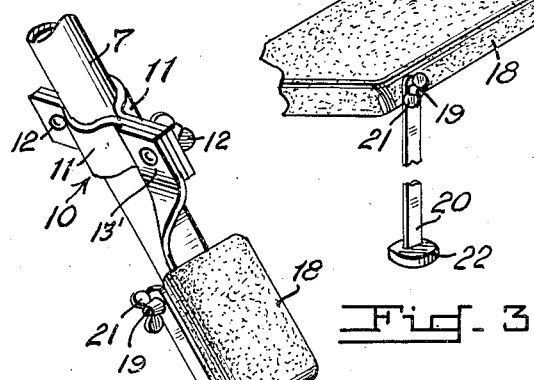
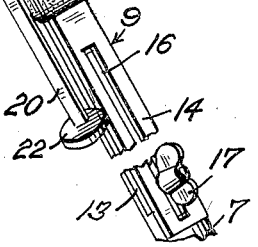
Inventor
Durward L. Lawrence
By Randolph & Beavers
Attorneys Patented Dec. 13, 1949

2,491,009

UNITED STATES PATENT OFFICE 2,491,009

MOTOR VEHICLE ATTACHMENT

Durward L. Lawrence, Steele, Mo., assignor of forty per cent to Robert Beal, Gatewood, Mo.

Application June 13, 1947, Serial No. 754,405

2 Claims. (Cl. 248—230)

This invention relates to an attachment for steering posts of motor vehicles and more particularly to an adjustable arm rest adapted to be supported by the steering post of a motor vehicle and which may be adjusted to an operative position for conveniently supporting one of the forearms of the driver or other occupant of the front seat of a vehicle, or which may be positioned in an inoperative position against the steering post, when not in use.

Still another object of the invention is to provide an attachment of the aforedescribed character having means for detachably supporting a container for cigarettes, matches and ashes and which is adjustably and detachably disposed with respect to the arm rest for maximum convenience to the vehicle operator or a passenger riding on the same seat.

Various other objects and advantages of the invention will hereinafter become more fully apparent from the following description of the drawing, illustrating a preferred embodiment thereof, and wherein:

Figure 1 is a perspective view showing the attachment, with the cigarette, match and ash container removed, in an operative position;

Figure 2 is an enlarged perspective view of the attachment, including the cigarette, match and ash container, and Figure 3 is a perspective view similar to Figure 1 but showing the arm rest in a folded, inoperative position.

Referring more specifically to the drawing, for the purpose of illustrating a preferred adaptation of the invention, hereinafter to be described, 4 designates generally a portion of a motor vehicle including a portion of the front seat 5 thereof, the steering wheel 6 and steering post 7.

The attachment, designated generally 8 and comprising the invention, includes an arm rest, designated generally 9 and illustrated in Figures 1 and 3. The arm rest 9 includes a clamp 10 formed of corresponding clamping sections 11 having apertured ears or extensions at the ends thereof for receiving for bolt and wing nut fastenings 12 by which the clamp 10 is detachably secured and clamped to the steering post 7.

The arm rest 9 also includes two elongated arms 13 and 14 which are provided with elongated, longitudinally extending slotted openings 15 and 16, respectively, which extend to adjacent corresponding ends thereof and which are adapted to receive a bolt and wing nut fastening 17 by means of which said bars or arms 13 and 14 are adjustably connected.

The opposite end of the arm 13 terminates in a portion 13' which is twisted so as to be disposed substantially at an oblique angle to the plane of the remainder of said arm 13 and which is apertured to receive the bolt of one of the fastenings 12 for detachably and adjustably connecting said arm 13 to the clamp 10. The opposite free end of the arm or bar 14 mounts an arm rest element 18 which is considerably wider than the bars 13 and 14 and the upper surface of which is preferably provided with rounded edges and may, if desired, be provided with a pad or cushioned upper side.

A bolt 19 extends outwardly from one longitudinal side of the rest element 18 for pivotally receiving a brace 20 which is connected thereto adjacent one end of said brace and which may be adjustably clamped relatively to the arm rest element 18 by a wing nut 21 which engages the bolt 19, on the outer side of said brace 20. The brace 20 is provided with a pad or foot 22 at its free end and which is adapted to rest on the seat 5 when said brace is disposed in a depending, operative position, as seen in Figures 1 and 2.

By clamping the arm 13 so that it is disposed substantially in alignment with the clamp 10, said arm will project transversely from the steering post 7 and will be disposed in substantially a horizontal plane. The arm 14 is clamped by the fastening 17 to the arm 13 so that it projects substantially at a right angle thereto and rearwardly or toward the seat 5. By adjustably positioning the fastening 17 in the slots 15 and 16 the location of the rest element 18 may be varied relatively to the steering wheel 6 for positioning it at the most convenient location to an arm of the operator of the vehicle. With the brace 20 disposed in a depending position, the foot 22 thereof will rest on the seat to provide a brace for the outer end of the arm rest 9 and especially the rest element 18. This is the usual position of the arm rest, as illustrated in Figure 1, for use as a rest or support for the right arm of the driver of the vehicle, due to the fact that the left arm may be rested either on the window frame of the door or on a rest carried by the inner side of the door. However, if desired, the arm rest may be mounted on the opposite side of the steering post 7 for employment as a rest for the left arm or a second arm rest may be utilized which may also be connected to the clamp 10.

Likewise, the arm rest 9 may be adjusted for use as a rest or support for the left arm of a passenger riding on the front seat of the vehicle by positioning the arm 14 at an obtuse angle to the arm 13 and so that the rest 18 will be convenient to the left arm of said passenger.

The arm rest is not required, the brace 20 is folded along the rest element 18 and bar 14 and clamps in said position by tightening the nut 19 and the bar 14 is folded and clamped against the bar 13. The fastening 12 supporting the bar 13 is then loosened to permit said bar and the remainder of the nested rest carried thereby, to be disposed against the steering post 7 and in its depending relationship to the clamp 10, and said fastening 12 is then tightened to complete the clamping of the arm rest 9 in its folded, inoperative position of Figure 3.

The attachment 8 may also include a container, designated generally 23 which is detachably supported by the bar 14 by means of a threaded stem 24 which depends from the bottom of the container 23 and which extends slidably through the slot 16. The threaded stem 24 carries a wing nut 25 which is adapted to be tightened for adjustably clamping said container to the bar 14, and it will be readily obvious that the container 23 may be located anywhere within the limits of the slot 16, or, if desired, may be similarly mounted on the bar 13 by connection with the slot 15. The container 23 includes an enlarged, upwardly opening receptacle portion 26 adapted to contain cigarettes, an ash receiver 27 which extends from one side thereof and which is normally disposed to extend from the receptacle 26 toward the arm rest element 18, and a holder portion or clamp 28 which is disposed beneath the ash receptacle 27 and which is adapted to engage and demountably support an end of a match containing box 29 so that said box will likewise extend toward the rest element 28 and to beyond the receptacle 27 so that matches may be conveniently reached by the driver. It will thus be readily apparent that the container 23 affords a convenient smoking accessory by the use of which cigarettes, matches and a receptacle for ashes will be conveniently available to the driver and for use with the right-hand which is normally supported by the rest element 18. Obviously, the receptacle or container 23 can be removed when not employed and for emptying the ashes therefrom and when the arm rest 9 is in its folded position of Figure 3.

Obviously the attachment can be manufactured of various materials such as metal, plastic, etc. and the parts welded or otherwise secured together.

Various modifications and changes are contemplated and may obviously be resorted to, without departing from the spirit and scope of the invention as hereinafter defined by the appended claims.

I claim as my invention:

1. An arm rest attachment for steering posts of motor vehicles comprising a clamp detachably secured to a steering post of a motor vehicle, an arm detachably and adjustably connected to said clamp and projecting laterally from the steering post when in an operative position, a second arm pivotally and slidably connected to the first mentioned arm and having an arm rest element carried thereby and disposed adjacent the steering wheel to provide a rest, and a brace adjustably connected to said rest element for disposition in a depending, operative position with respect thereto for engagement with a vehicle seat for bracing the arm rest element.

2. An arm rest attachment for steering posts of motor vehicles comprising a clamp detachably secured to a steering post of a motor vehicle, an arm detachably and adjustably connected to said clamp and projecting laterally from the steering post when in an operative position, a second arm pivotally and slidably connected to the first mentioned arm and having an arm rest element carried thereby and disposed adjacent the steering wheel to provide a rest, said arms being provided with longitudinally extending slots and clamping fastening means adjustably engaging said slots to permit pivotal and sliding movement of the arms relatively to one another and for adjustably clamping the arms in a plurality of positions.

DURWARD L. LAWRENCE.

REFERENCES CITED

The following references are of record in the file of this patent:

UNITED STATES PATENTS

| Number | Name | Date |
|---|---|---|
| 531,257 | Bond | Dec. 18, 1894 |
| 1,266,367 | Wilson | May 14, 1918 |
| 1,405,309 | Mathews | Jan. 31, 1922 |
| 1,532,590 | Kittelson | Apr. 7, 1925 |
| 1,843,268 | Burkholder | Feb. 2, 1932 |
| 1,892,048 | Genung | Dec. 27, 1932 |

FOREIGN PATENTS

| Number | Country | Date |
|---|---|---|
| 2,906 | France | of 1830 |
| 470,502 | Great Britain | Aug. 16, 1937 |